US012044375B1

(12) United States Patent
Lee

(10) Patent No.: US 12,044,375 B1
(45) Date of Patent: Jul. 23, 2024

(54) LAMP AND LAMP ASSEMBLY FOR VEHICLE

(71) Applicant: HYUNDAI MOBIS CO., LTD., Seoul (KR)

(72) Inventor: Hyun Soo Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/340,131

(22) Filed: Jun. 23, 2023

(30) Foreign Application Priority Data

Jan. 6, 2023 (KR) ........................ 10-2023-0002398

(51) Int. Cl.
*F21S 41/27* (2018.01)
*F21S 41/143* (2018.01)
*F21S 41/147* (2018.01)
*F21S 41/43* (2018.01)

(52) U.S. Cl.
CPC ............. *F21S 41/27* (2018.01); *F21S 41/143* (2018.01); *F21S 41/147* (2018.01); *F21S 41/43* (2018.01)

(58) Field of Classification Search
CPC ........ F21S 41/27; F21S 41/147; F21S 41/143; F21S 41/43; F21S 41/25; F21S 41/255; F21S 41/26; F21S 41/265; F21S 41/148; B60Q 1/0058; B60Q 1/0001
See application file for complete search history.

(56) References Cited

U.S. PATENT DOCUMENTS 9,464,775 B2 * 10/2016 Kanayama .............. F21S 45/10
10,082,272 B2 * 9/2018 Gromfeld ............. F21S 41/265
10,605,428 B2 * 3/2020 Ecker-Endl ........... F21S 41/663
10,697,602 B2 * 6/2020 Manassero .............. F21S 41/43
10,731,824 B2 * 8/2020 Kawai ...................... F21S 41/24
11,754,245 B1 9/2023 Lee
2014/0016343 A1 * 1/2014 Brendle ................ F21S 41/255 362/516
2014/0036526 A1 * 2/2014 Sato ...................... F21S 41/322 362/518
2019/0017675 A1 * 1/2019 Suwa ...................... F21S 41/24
2022/0349542 A1 * 11/2022 Zhu ....................... F21S 41/143

FOREIGN PATENT DOCUMENTS

DE 102021122111 A1 8/2022
EP 4006408 A1 11/2020
EP 3508777 A1 7/2021
EP 3907427 A1 11/2021
EP 3929034 A1 12/2021

OTHER PUBLICATIONS

Extended European Search Report dated Dec. 14, 2023 issued in corresponding European Patent Application No. 23180818.9.

* cited by examiner

*Primary Examiner* — Matthew J. Peerce
(74) *Attorney, Agent, or Firm* — NovoTechIP International PLLC

(57) ABSTRACT

Disclosed are a lamp for a vehicle, and a lamp assembly for a vehicle. The lamp for a vehicle includes a first light source that emits a first light along a first direction that is perpendicular to an upward/downward direction, a refractor that refracts the first light emitted from the first light source, a second light source that emits a second light toward the refractor along a second direction that crosses the first direction, and a third light source disposed adjacent to the second light source, and that emits a third light toward the refractor along the second direction.

16 Claims, 8 Drawing Sheets

LAMP AND LAMP ASSEMBLY FOR VEHICLE

CROSS-REFERENCE TO RELATED APPLICATIONS

This application claims the benefit of priority to Korean Patent Application No. 10-2023-0002398, filed in the Korean Intellectual Property Office on Jan. 6, 2023, the entire contents of which are incorporated herein by reference.

TECHNICAL FIELD

The present disclosure relates to a lamp for a vehicle, and a lamp assembly for a vehicle including the same.

BACKGROUND

In general, a vehicle is equipped with various lamps. These lamps perform different functions including a lighting function for easily identifying a target located around the vehicle during nighttime driving, and a signal function for informing other vehicles or road users of a driving state or intended movement of the vehicle.

For example, a low beam lamp is mainly directed to a lighting function, and is directed to a turn signal function commonly referred to as a blinker.

In recent years, rules that force lamps to be turned on during daytimes have been newly made to reduce traffic accidents. Thus, daytime running lights (DRLs) are mounted on recently released vehicles.

The low beam lamps, the blinkers, and the daytime lamps have different purposes, and all of them should be mounted in an interior of the vehicle. However, in the conventional technology, because the low beam lamps, the blinkers, and the daytime lamps should be disposed in individual lamp spaces, respectively, they occupy a large space and the sizes of the lamps has to be small.

SUMMARY

The present disclosure has been made to solve the above-mentioned problems occurring in the prior art while advantages achieved by the prior art are maintained intact.

An aspect of the present disclosure provides a lamp for a vehicle, and a lamp assembly for a vehicle, which may implement low beam lamps, blinkers, and daytime lamps in one module.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a lamp for a vehicle includes a first light source that emits a first light along a first direction that is perpendicular to an upward/downward direction; a refractor that refracts the first light emitted from the first light source; a second light source that emits a second light toward the refractor along a second direction that crosses the first direction; and a third light source disposed adjacent to the second light source, and that emits a third light toward the refractor along the second direction.

In another example, a direction that is perpendicular to the first direction is defined as a third direction. The second light source and the third light source may be arranged along the third direction.

In another example, the lamp may further include a first collimator to collimate the first light, a second collimator disposed in the second direction of the second light source, and that collimates the second light, and a third collimator disposed in the second direction of the third light source, and that collimates the third light.

In another example, the second collimator and the third collimator may have symmetrical shapes.

In another example, the second collimator may have an arc shape, of which a central angle is 180 degrees or more when viewed along the second direction, and a string of the arc shape may have a shape that extends in a direction that is perpendicular to the second direction and the third direction. The string of an arc refers to the line segment that connects the endpoints of the arc. An arc has a curvature, and the string is the straight line that spans the length of that arc. The string can also be considered the base for the arc.

In another example, the second collimator may be formed to be convex along an opposite direction to the second direction.

In another example, the lamp may further include a coupling part, with which the second collimator and the third collimator are coupled to each other, an overlapping junction at which the second collimator and the third collimator overlap each other, may be disposed on a central side of the coupling part.

In another example, the refractor may include a first input area, to which the first light is input, a second input area, to which the second light and the third light are input, and an output area, from which the first to third lights are output, and the second input area may be formed between the first input area and the output area.

In another example, the refractor may include a first shield area that interrupts a portion of the first light that passed through the first input area, and the second light source and the third light source may be disposed on a lower side of the first shield area.

In another example, the refractor further may include a second shield area that interrupts a portion of the second light and a portion of the third light, which passed through the second input area.

In another example, the lamp may further include a first collimator disposed in the first direction of the third light source, and that collimates the first light, and the first collimator may be spaced apart from the first input area along the first direction.

According to another aspect of the present disclosure, a lamp assembly for a vehicle includes a first lamp, and a second lamp disposed on a lower side of the first lamp, the first lamp includes a (1-1)-th light source that emits a (1-1)-th light along a (1-1)-th direction that is horizontal, a first refractor that refracts the (1-1)-th light emitted from the (1-1)-th light source, a (1-2)-th light source that emits a (1-2)-th light toward the first refractor along a second direction that crosses the first direction, and a (1-3)-th light source disposed adjacent to the (1-2)-th light source, and that emits a (1-3)-th light toward the first refractor along the second direction, the second lamp includes a (2-1)-th light source that emits a (2-1)-th light along the first direction, a second refractor that refracts the (2-1)-th light emitted from the (2-1)-th light source, a (2-2)-th light source that emits a (2-2)-th light toward the second refractor along the second direction, and a (2-3)-th light source disposed adjacent to the (2-2)-th light source, and that emits a (2-3)-th light toward the second refractor along the second direction, the (1-2)-th light corresponds to the (2-3)-th light, and the (1-3)-th light corresponds to the (2-2)-th light.

In another example, the first lamp may include a (1-2)-th collimator disposed in the second direction of the (1-2)-th light source, and that collimates the (1-2)-th light, and a (1-3)-th collimator disposed in the second direction of the (1-3)-th light source, and that collimates the (1-3)-th light, the second lamp may include a (2-2)-th collimator disposed in the second direction of the (2-2)-th light source, and that collimates the (2-2)-th light, and a (2-3)-th collimator disposed in the second direction of the (2-3)-th light source, and that collimates the (2-3)-th light, the (1-2)-th collimator may corresponds to the (2-3)-th collimator, and the (1-3)-th collimator may correspond to the (2-2)-th collimator.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
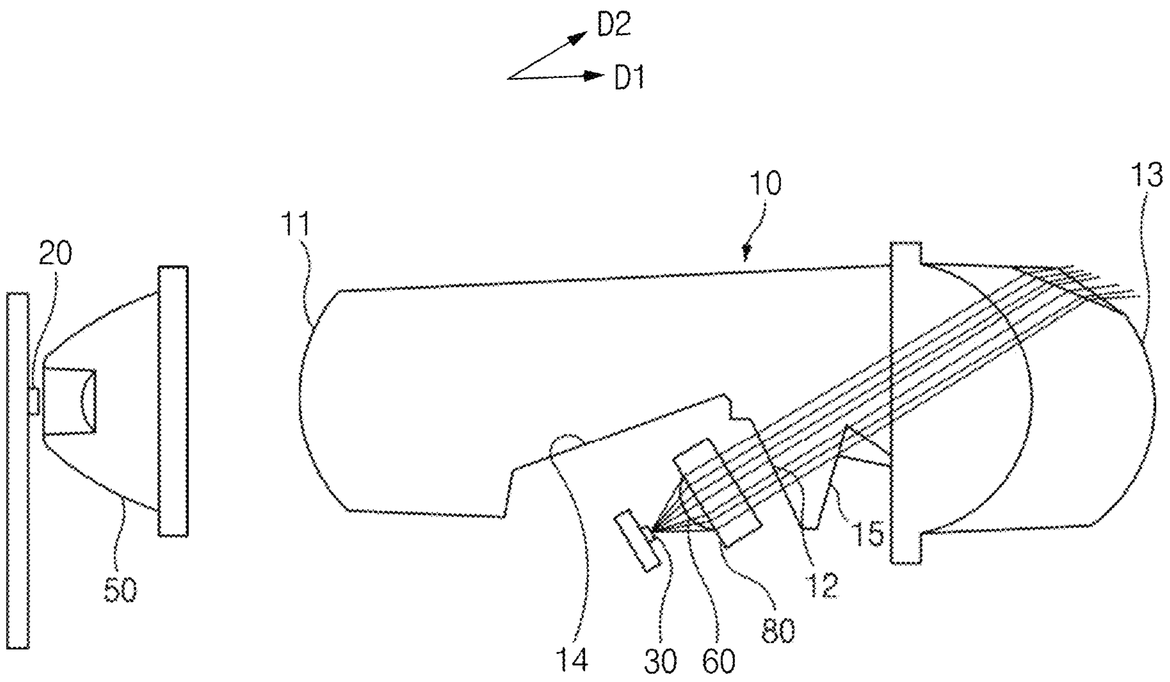
FIG. 1 is a view conceptually illustrating a lamp for a vehicle according to an embodiment of the present disclosure.

Hereinafter, some embodiments of the present disclosure will be described in detail with reference to the exemplary drawings. Throughout the specification, it is noted that the same or like reference numerals denote the same or like components even though they are provided in different drawings. Further, in the following description of the present disclosure, a detailed description of known functions and configurations incorporated herein will be omitted when it may make the subject matter of the present disclosure rather unclear.

A lamp according to an embodiment of the present disclosure relates to a lamp that may be used in a vehicle. As an example, the lamp for a vehicle may be a headlamp. As an example, the lamp for a vehicle may be a lamp for irradiating a low beam. However, the present disclosure is not limited thereto, and it is apparent that the lamp according to the embodiment of the present disclosure may be applied to lamps of various fields, such as a rear lamp.

Forward/rearward, leftward/rightward, and upward/downward directions in the specification are referred for convenience of description, and may be directions that are perpendicular to each other. However, the directions are determined relative to a direction, in which the lamp is arranged, and the upward/downward direction does not always mean a vertical direction.

Figure 2:
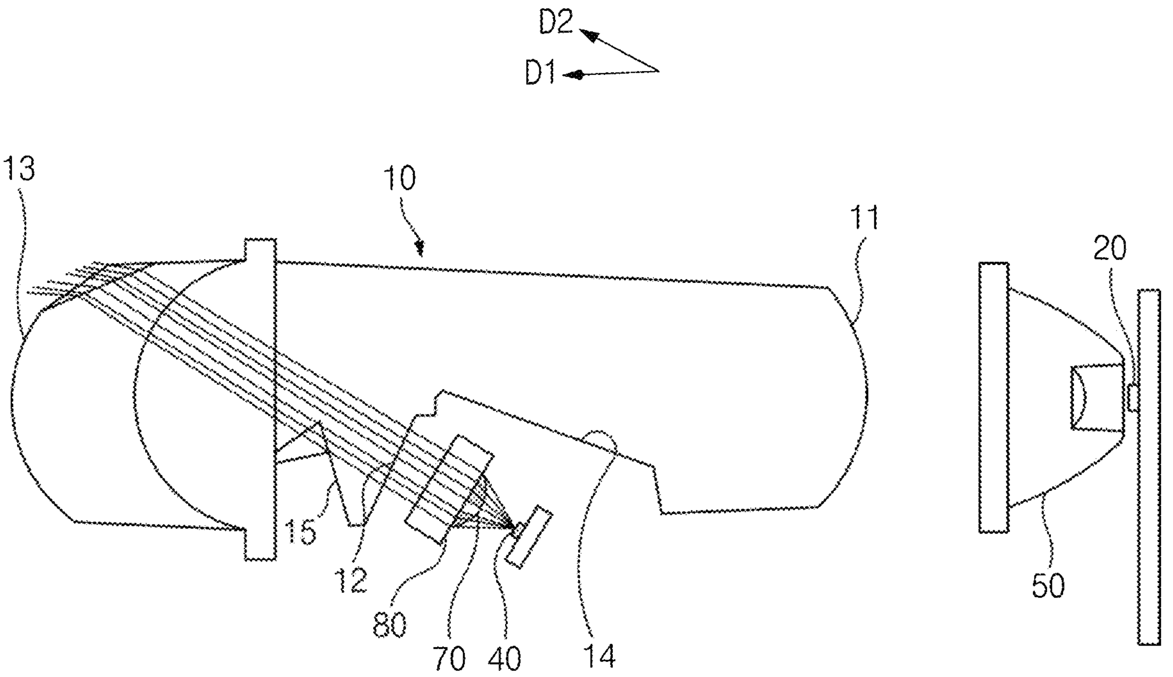
FIG. 2 is a view illustrating an appearance of the lamp for a vehicle of FIG. 1, when viewed from another direction.

FIG. 1 is a view conceptually illustrating a lamp for a vehicle according to an embodiment of the present disclosure. FIG. 2 is a view illustrating an appearance of the lamp for a vehicle of FIG. 1, when viewed from another direction.

The lamp for a vehicle according to an embodiment of the present disclosure may include a refractor 10, a first light source 20, a second light source 30, and a third light source 40. The refractor 10 may be configured to refract lights emitted from the first to third light source 20, 30, and 40. The first light source 20 may emit a first light along a first direction D1 that is perpendicular to the upward/downward direction. As an example, the first direction D1 may be a forward direction. The first light may be a low beam. The refractor 10 may be configured to refract the first light emitted from the first light source 20.

The second light source 30 may emit a second light toward the refractor 10 along a second direction D2 that is a direction that crosses the first direction D1. The second light may be a daytime lamp. The third light source 40 may be disposed adjacent to the second light source 30, and may emit a third light toward the refractor 10 along the second direction D2. The third light may be a blinker.

According to the present disclosure, because the blinker and the daytime lamp may be disposed in one module to be adjacent to each other such that the lamp for a vehicle may become a module, a use efficiency of spaces of the vehicle may be increased and the lamps may be installed conveniently.

Hereinafter, a detailed form of the lamp for a vehicle having the features will be described in detail. Assume that a direction that is perpendicular to the first direction D1 is defined as a third direction D3. The second light source 30 and the third light source 40 may be arranged along the third direction D3. As an example, the second light source 30 may be disposed in the third direction D3 of the third light source 40. As another example, the third light source 40 may be disposed in the third direction D3 of the second light source 30. Then, they may be spaced apart from each other.

The lamp for a vehicle according to an embodiment of the present disclosure may include a first collimator 50, a second collimator 60, and a third collimator 70. The first collimator 50 may be disposed in the first direction D1 of the first light source 20, and may be configured to collimate the first light.

Figure 3:
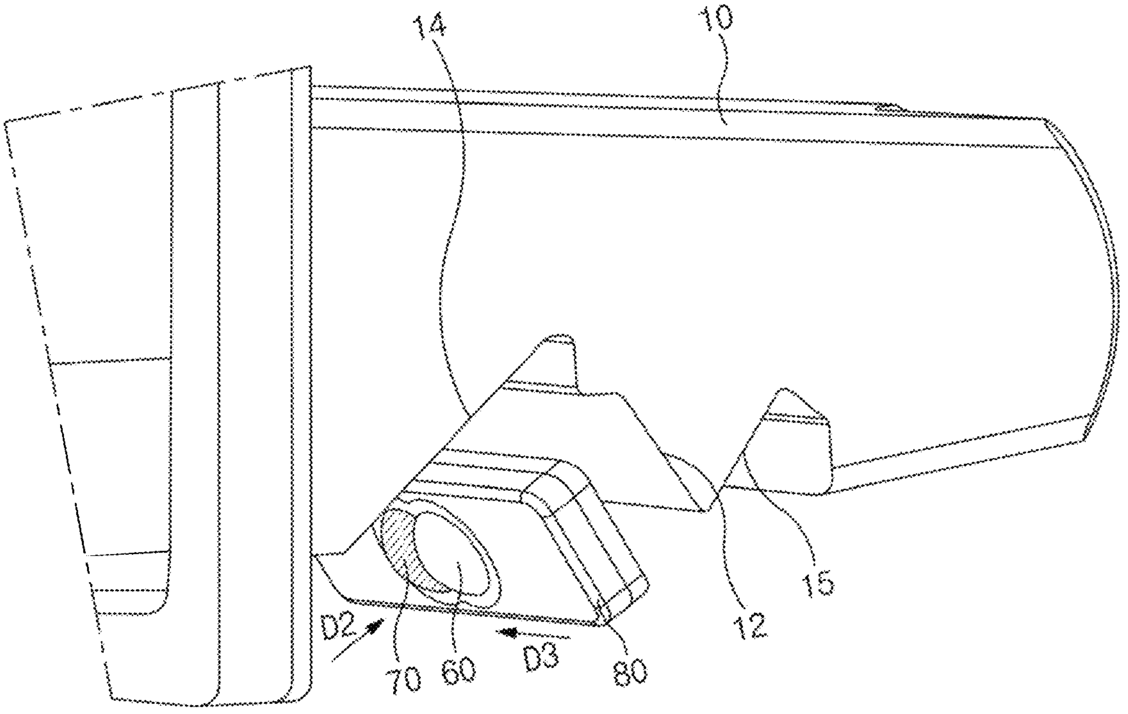
FIG. 3 is a perspective view illustrating a second collimator and a third collimator.
Figure 4:
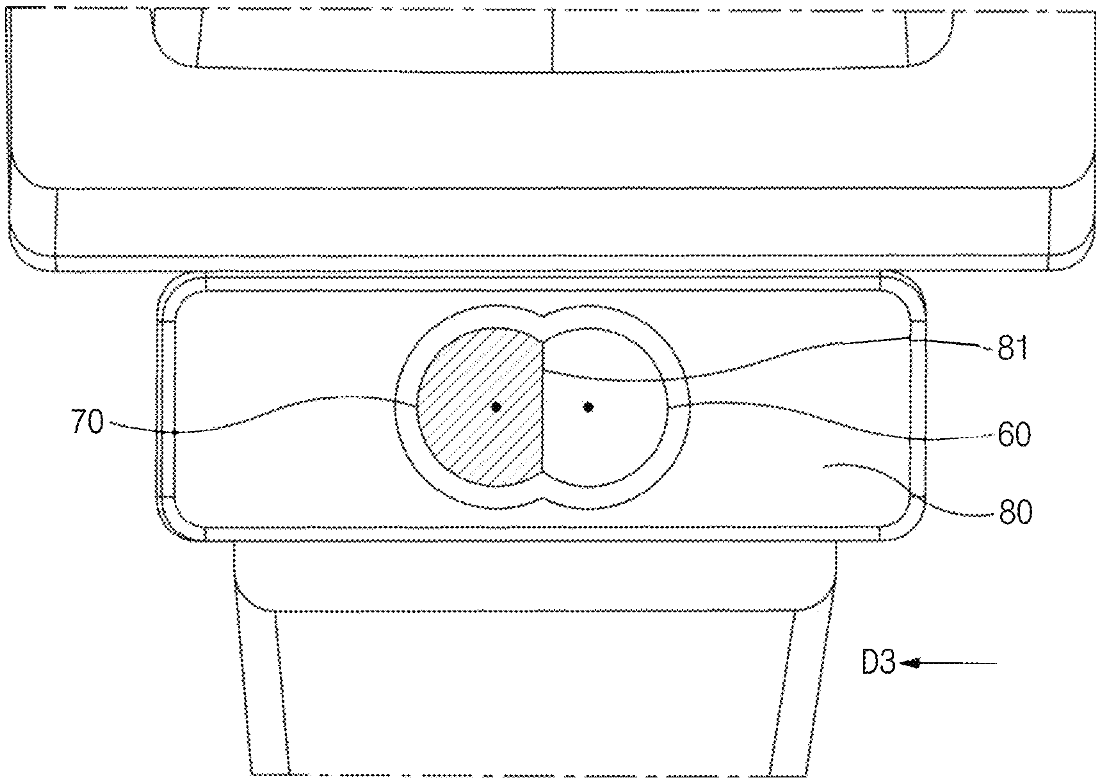
FIG. 4 is a view of a second collimator and a third collimator, when viewed along a second direction.

FIG. 3 is a perspective view illustrating a second collimator and a third collimator. FIG. 4 is a view of a second collimator and a third collimator, when viewed along a second direction. The second collimator 60 may be disposed in the second direction D2 of the second light source 30 and may be configured to collimate the second light. The third collimator 70 may be disposed in the second direction D2 of the third light source 40 and may be configured to collimate the third light. The second collimator 60 and the third collimator 70 may have symmetrical shapes.

As an example, when the second collimator 60 is viewed along the second direction D2, it may have an arc shape, of which a central angle is 180 degrees or more. Then, a string of the arc shape may extend in a direction that is perpendicular to the second direction D2 and the third direction D3. Furthermore, the second collimator 60 may be formed to be convex along an opposite direction to the second direction D2. It may be understood that the second collimator 60 has a shape obtained by cutting a portion of a convex lens.

The second light source 30 may be located at a site that is moved from a center point of the arc shape along an opposite direction of the second direction D2.

Likewise, when the third collimator 70 is viewed along the second direction D2, it may have an arc shape, of which a central angle is 180 degrees or more. Then, a string of the arc shape may extend in a direction that is perpendicular to the second direction D2. Furthermore, the third collimator 70 may be formed to be convex along an opposite direction to the second direction D2. It may be understood that the third collimator 70 as a shape obtained by cutting a portion of a convex lens.

Meanwhile, the third light source 40 may be located at a site that is moved from a center point of the arc shape along an opposite direction of the second direction D2. When the central angle of the arc shape is 180 degrees, locations of the second light source 30 and the third light source 40 overlap each other. Accordingly, it is preferable that the central angle of the arc shape is 180 degrees or more.

The lamp for a vehicle according to an embodiment of the present disclosure may further include a coupling part 80. The coupling part 80 may be a part, in which the second collimator 60 and the third collimator 70 are coupled to each other. A junction 81 is where the second collimator 60 and the third collimator 70 overlap each other. The junction 81 may be located at a central portion of the coupling part 80. This may mean that the second light source 30 and the third light source 40 may have corresponding locations at locations that are spaced apart from the center of the coupling part 80 along the third direction D3 or an opposite direction thereto.

Next, a shape of the refractor 10 will be described in detail. The refractor 10 may include a first input area 11, a second input area 12, and an output area 13. The first input area 11 may be an area, to which the first light is input. The second input area 12 may be an area, to which the second light and the third light are input. The output area 13 may be an area, from which the first to third lights 20, 30, 40 are output. Then, the second input area 12 may be formed between the first input area 11 and the output area 13.

The refractor 10 may include a first shield area 14. The first shield area 14 may be configured to interrupt a portion of the first light that passed through the first input area 11. The second light source 30 and the third light source 40 may be disposed on a lower side of the first shield area 14.

The refractor 10 may include a second shield area 15. The second shield area 15 may be configured to interrupt a portion of the second light and a portion of the third light, which passed through the second input area 12.

Figure 5:
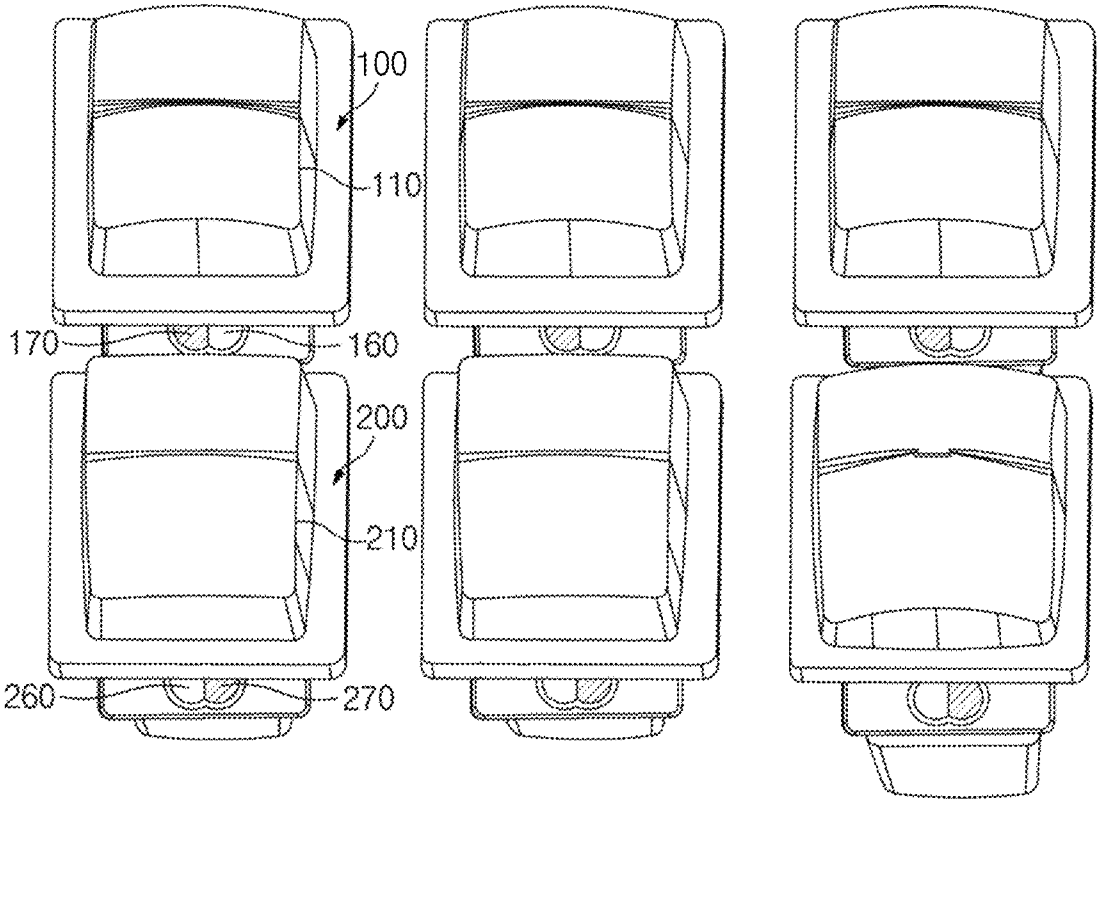
FIG. 5 is a view conceptually illustrating a lamp assembly for a vehicle according to an embodiment of the present disclosure.

Hereinafter, the lamp assembly for a vehicle including the lamp for a vehicle will be described in detail with reference to the description of the above-described lamp for a vehicle. FIG. 5 is a view conceptually illustrating the lamp assembly for a vehicle according to an embodiment of the present disclosure. For reference, illustration of the light sources is omitted in FIG. 5 to facilitate understanding.

Hereinafter, the lamp assembly for a vehicle will be described with reference to FIG. 5. Configurations that are the same as or correspond to those of the above-described lamp for a vehicle will be marked with the same or corresponding reference numerals, and a detailed description thereof will be omitted.

The lamp assembly for a vehicle according to an embodiment of the present disclosure may include a first lamp 100 and a second lamp 200. The second lamp 200 may be disposed on a lower side of the first lamp 100. Here, it is apparent that the expression of the first lamp 100 and the second lamp 200 is not intended to limit the number of the lamps, and a plurality of lamps may be further included. Each lamp 100 and 200 includes multiple light sources and multiple collimators. Thus, for clarity, here and in the appended claims, different light sources and collimators are identified by a number pair as in the (x-y)-th light source or the (x-y)-th collimator, x indicating whether the light source or collimator is in the first or second lamp (100 or 200), and y numbering the different light sources or collimators for a particular lamp. Thus, the first light source in the first lamp is identified as the (1-1)-th light source, and the third light source in the second lamp is identified as the (2-3)-th light source. The same for the collimators.

Thus, the first lamp 100 may include a first refractor 110, a (1-1)-th light source, a (1-2)-th light source, and a (1-3)-th light source. The first refractor 110 may be configured to refract the light emitted from the (1-1)-th to (1-3)-th light sources. The (1-1)-th light source may emit a (1-1)-th light along the first direction D1. The (1-1)-th light may be a low beam.

The (1-2)-th light source may emit a (1-2)-th light toward the first refractor 110 along the second direction D2. The (1-2)-th light may be a daytime lamp. The (1-3)-th light source may be disposed adjacent to the (1-2)-th light source, and may emit a (1-3)-th light toward the first refractor 110 along the second direction D2. The (1-3)-th light may be a blinker.

The second lamp 200 may include a second refractor 210, a (2-1)-th light source, a (2-2)-th light source, and a (2-3)-th light source. The second refractor 210 may be configured to refract the light emitted from the (2-1)-th to (2-3)-th light sources. The (2-1)-th light source may emit a (2-1)-th light along the first direction D1. The (2-1)-th light may be a low beam.

The (2-2)-th light source may emit a (2-2)-th light toward the second refractor 210 along the second direction D2. The (2-2)-th light may be a blinker. The (2-3)-th light source may be disposed adjacent to the (2-2)-th light source, and may emit a (2-3)-th light toward the second refractor 210 along the second direction D2. The (2-3)-th light may be a daytime lamp.

This means that the (1-2)-th light may correspond to the (2-3)-th light and the (1-3)-th light may correspond to the (2-2)-th light.

The first lamp 100 may include a (1-2)-th collimator 160 and a (1-3)-th collimator 170. The (1-2)-th collimator 160 may be disposed in the second direction D2 of the (1-2)-th light source, and may be configured to collimate the (1-2)-th light. The (1-3)-th collimator 170 may be disposed in the second direction D2 of the (1-3)-th light source, and may be configured to collimate the (1-3)-th light.

The second lamp 200 may include a (2-2)-th collimator 260 and a (2-3)-th collimator 270. The (2-2)-th collimator 260 may be disposed in the second direction D2 of the (2-2)-th light source, and may be configured to collimate the (2-2)-th light. The (2-3)-th collimator 270 may be disposed in the second direction D2 of the (2-3)-th light source, and may be configured to collimate the (2-3)-th light. That is, as illustrated in the drawings, the (1-2)-th collimator 160 may correspond to the (2-3)-th collimator 270 and the (1-3)-th collimator 170 may correspond to the (2-2)-th collimator 260.

Figure 6:
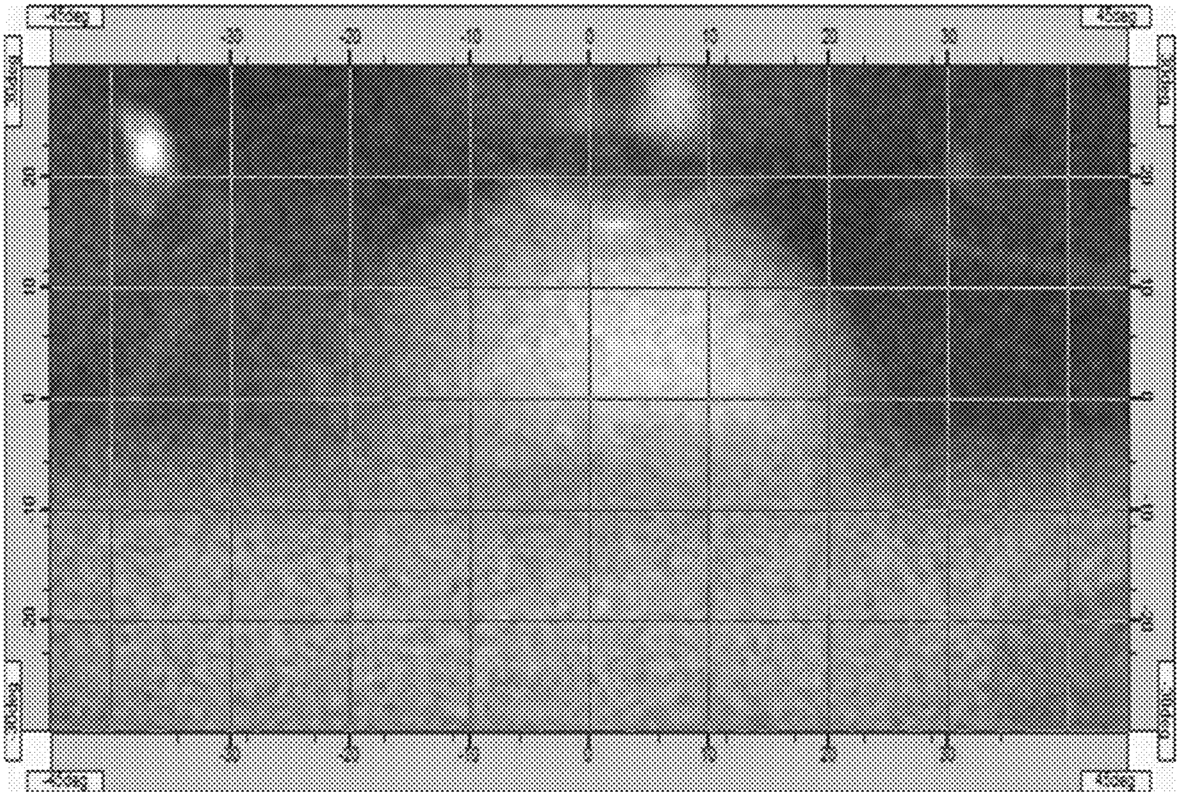
FIG. 6 illustrates a first irradiation area of a (1-2)-th light irradiated by a (1-2)-th light source of a first lamp.
Figure 7:
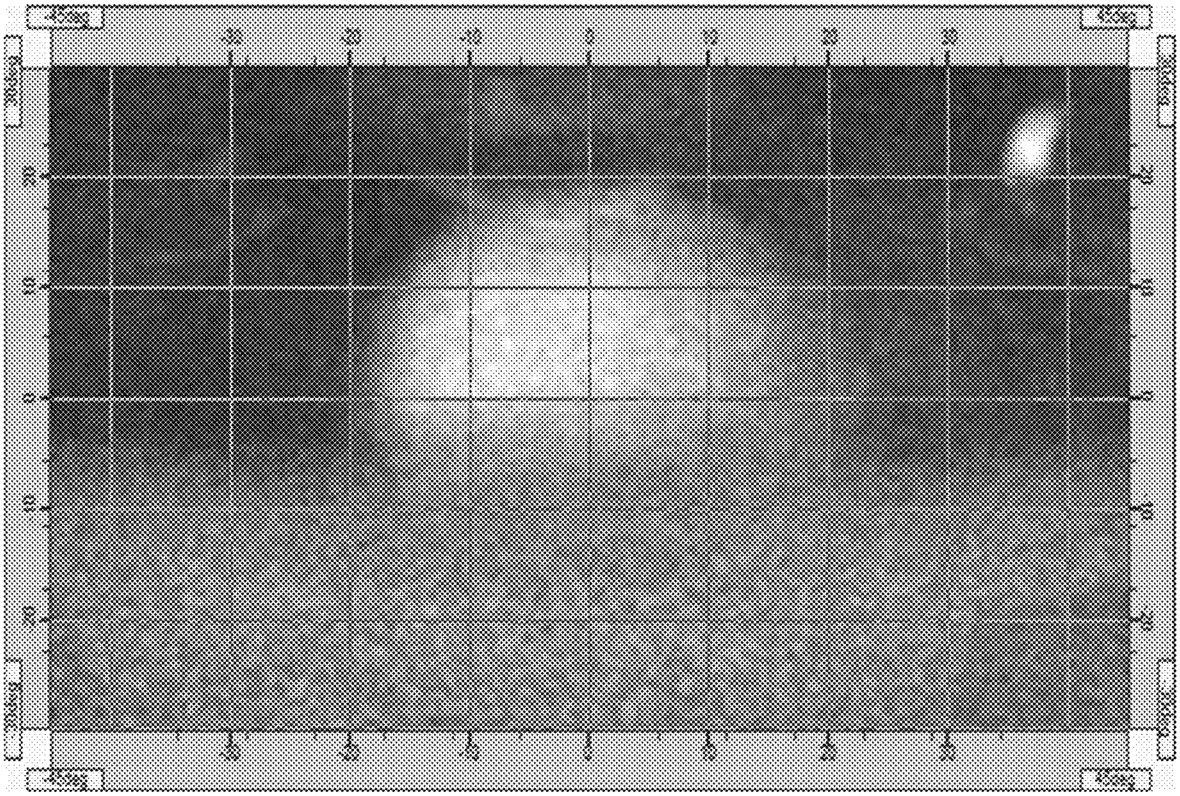
FIG. 7 illustrates a second irradiation area of a (2-3)-th light irradiated by a (2-3)-th light source of a first lamp.
Figure 8:
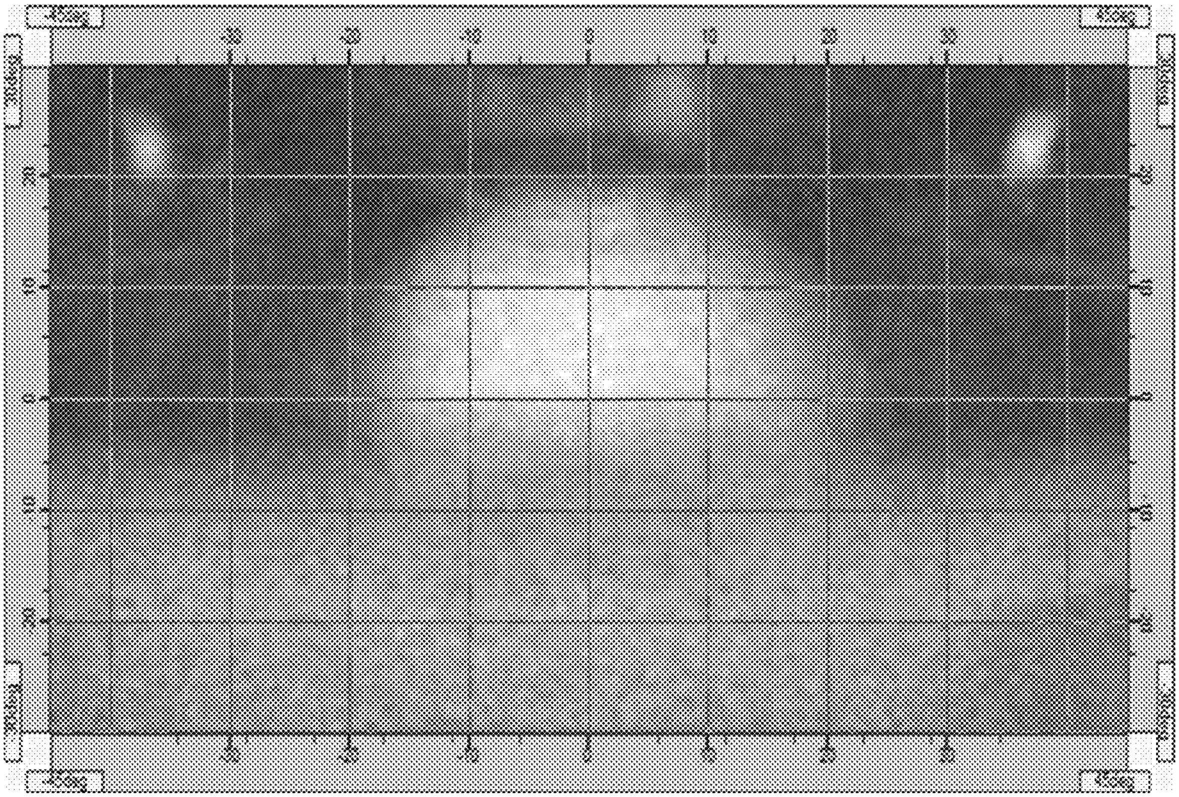
FIG. 8 illustrates an appearance, in which the first irradiation area of the (1-2)-th light irradiated by the (1-2)-th light source of the first lamp and the second irradiation area of the (2-3)-th light irradiated by the (2-3)-th light source of the second lamp overlap each other.

FIG. 6 illustrates a first irradiation area of the (1-2)-th light irradiated by the (1-2)-th light source of the first lamp. FIG. 7 illustrates a second irradiation area of the (2-3)-th light irradiated by the (2-3)-th light source of the first lamp. FIG. 8 illustrates an appearance, in which the first irradiation area of the (1-2)-th light irradiated by the (1-2)-th light source of the first lamp and the second irradiation area of the (2-3)-th light irradiated by the (2-3)-th light source of the second lamp overlap each other.

As described above, in the lamp for a vehicle, the (1-2)-th light source and the (2-3)-th light source may be located at locations that are spaced apart from a central portion of the lamp in the third direction D3 or an opposite direction thereto. In detail, when the (1-2)-th light source is spaced apart from the central portion of the lamp along the third direction D3, the (2-3)-th light source may be spaced apart from the central portion of the lamp along the opposite direction to the third direction D3. Accordingly, when the (1-2)-th light is irradiated only by the (1-2)-th light source or the (2-3)-th light is irradiated only by the (2-3)-th light source, light that deviates from the central portion of the lamp is emitted.

For example, in FIG. 6, the first irradiation area formed by the (1-2)-th light source is biased to a right side with respect to FIG. 6. Furthermore, in FIG. 7, the second irradiation area formed by the (2-3)-th light source is biased to a left side with respect to FIG. 6. Accordingly, when the (1-2)-th light source and the (2-3)-th light source emit light at the same time, symmetrical irradiation areas may be formed as illustrated in FIG. 8. The symmetrical irradiation areas may correspond to a beam pattern required in the rules.

According to the present disclosure, because the blinker and the daytime lamp may be disposed in one module to be adjacent to each other such that the lamp for a vehicle may become a module, a use efficiency of spaces of the vehicle may be increased and the lamps may be installed conveniently.

The above description is a simple exemplification of the technical spirits of the present disclosure, and the present disclosure may be variously corrected and modified by those skilled in the art to which the present disclosure pertains without departing from the essential features of the present disclosure. Accordingly, the embodiments disclosed in the present disclosure are not provided to limit the technical spirits of the present disclosure but provided to describe the present disclosure, and the scope of the technical spirits of the present disclosure is not limited by the embodiments. Accordingly, the technical scope of the present disclosure should be construed by the attached claims, and all the technical spirits within the equivalent ranges fall within the scope of the present disclosure.

What is claimed is:

1. A lamp for a vehicle comprising:
- a first light source configured to emit a first light along a first direction perpendicular to an upward/downward direction, wherein a headlight of the vehicle comprises the first light source;
- a refractor configured to refract the first light emitted from the first light source;
- a second light source configured to emit a second light toward the refractor along a second direction crossing the first direction, wherein a daytime light of the vehicle comprises the second light source; and
- a third light source disposed adjacent to the second light source, and configured to emit a third light toward the refractor along the second direction, wherein a blinker of the vehicle comprises the third light source,
- wherein the refractor includes:
- a first input area to which the first light is input;
- a second input area to which the second light and the third light are input; and
- an output area from which the first to third lights are output;
- wherein the second input area is formed between the first input area and the output area.

2. The lamp of claim 1, wherein:
- the second light source and the third light source are arranged along a third direction perpendicular to the first direction.

3. The lamp of claim 1, further comprising:
- a first collimator to collimate the first light;
- a second collimator disposed in the second direction of the second light source, and configured to collimate the second light; and
- a third collimator disposed in the second direction of the third light source, and configured to collimate the third light.

4. The lamp of claim 3, wherein the second collimator and the third collimator have symmetrical shapes.

5. The lamp of claim 4, wherein the second collimator has an arc shape, of which a central angle is 180 degrees or more when viewed along the second direction, and a string of the arc shape has a shape that extends in a direction that is perpendicular to the second direction and the third direction.

6. The lamp of claim 5, wherein the second collimator is formed to be convex along a direction opposite to the second direction.

7. The lamp of claim 3, further comprising:
- a coupling part, with which the second collimator and the third collimator are coupled to each other,
- an overlapping junction at which the second collimator and the third collimator overlap each other is disposed at a central portion of the coupling part.

8. The lamp of claim 1, wherein the refractor includes:
- a first shield area configured to interrupt a portion of the first light passing through the first input area,
- wherein the second light source and the third light source are disposed on a lower side of the first shield area.

9. The lamp of claim 8, wherein the refractor further includes
- a second shield area configured to interrupt a portion of the second light and a portion of the third light passing through the second input area.

10. The lamp of claim 3, further comprising
- the first collimator disposed in the first direction of the third light source and configured to collimate the first light,
- wherein the first collimator is spaced apart from the first input area along the first direction.

11. The lamp of claim 1, further comprising a collimator between the refractor and the second and third light sources, the collimator comprising a shape having two arcs, wherein the two arcs share a common string aligned vertically.

12. A lamp for a vehicle comprising:
- a first light source configured to emit a first light along a first direction;
- a refractor configured to refract the first light emitted from the first light source;
- a second light source configured to emit a second light toward the refractor along a second direction crossing the first direction;
- a third light source disposed adjacent to the second light source, and configured to emit a third light toward the refractor along the second direction; and
- a collimator between the refractor and the second and third light sources, the collimator comprising a shape having two arcs, wherein the two arcs share a common string aligned vertically, wherein the refractor includes:

a first input area to which the first light is input;

a second input area to which the second light and the third light are input; and an output area from which the first to third lights are output;

wherein the second input area is formed between the first input area and the output area.

13. The lamp of claim 12, wherein:

a headlight of the vehicle comprises the first light source;

a daytime light of the vehicle comprises the second light source; and a blinker of the vehicle comprises the third light source.

14. The lamp of claim 12, wherein the collimator comprises two convex portions extending toward the refractor.

15. The lamp of claim 12, wherein the collimator comprises two parts held together by a coupling part.

16. The lamp of claim 15, wherein a junction where the two parts of the collimator interface is located at a central portion of the coupling part.

* * * * *